United States Patent [19]

Meacham

[11] 4,059,842

[45] Nov. 22, 1977

[54] METHOD AND APPARATUS FOR SYNCHRONIZING A DIGITAL DIVIDER CHAIN WITH A LOW FREQUENCY PULSE TRAIN

[75] Inventor: James H. Meacham, Laurel, Md.

[73] Assignee: Westinghouse Electric Corporation, Pittsburgh, Pa.

[21] Appl. No.: 627,735

[22] Filed: Oct. 31, 1975

[51] Int. Cl.$^2$ .......................... H04N 5/06; H03F 3/42; H03F 3/68; H03K 1/17

[52] U.S. Cl. ...................................... 358/150; 331/18; 331/20; 328/48; 328/63

[58] Field of Search .................. 178/69.5 G, 69.5 DC, 178/69.5 TV, 69.5 R, 69.5 F; 307/269, 225 R; 328/41, 48, 63; 331/18, 20, 21; 358/158, 150, 148

[56] References Cited

U.S. PATENT DOCUMENTS

| | | | |
|---|---|---|---|
| 3,271,688 | 9/1966 | Gschwind et al. | 328/63 |
| 3,688,037 | 8/1972 | Ipri | 178/69.5 TV |
| 3,878,335 | 4/1975 | Balaban | 178/69.5 TV |
| 3,894,246 | 7/1975 | Torgrim | 307/269 |
| 3,916,102 | 10/1975 | Merrell | 358/158 |

OTHER PUBLICATIONS

Dryer et al., "Signal Synchronizer", *IBM Technical Disclosure Bulletin*, vol. 10, No. 9, Feb. 1968, p. 1352.
Day, "Synchronizable Clock", *IBM Technical Disclosure Bulletin*, vol. 4, No. 11, Apr. 1962, p. 42.

*Primary Examiner*—John C. Martin
*Attorney, Agent, or Firm*—C. F. Renz

[57] ABSTRACT

A method and apparatus for synchronization of a digital divider chain with a low frequency reference pulse train is embodied in the form of all digital circuit apparatus suitable for fabrication by state of the art high density packaging techniques such as Large Scale Integration (LSI) or Multi-chip Hybrid Packaging (MHP). Each individual substage of the divider chain is reset to its ZERO condition by a circuit including first and second flip-flops which receives inputs from the master oscillator clock driving the divider chain and from the source of the low frequency reference pulse train.

20 Claims, 7 Drawing Figures

METHOD AND APPARATUS FOR SYNCHRONIZING A DIGITAL DIVIDER CHAIN WITH A LOW FREQUENCY PULSE TRAIN

CROSS-REFERENCE TO A RELATED PATENT

A U.S. Pat. No. 3,777,063, assigned to the same assignee as the present invention (and also made by the same inventor) discloses a television synch signal generation system which is technically related to what is disclosed herein. More particularly the present invention is suitable as a synchronization feature to incorporate in that system. However, there is no relationship of an invention claimed herein being disclosed in U.S. Pat. No. 3,777,063.

BACKGROUND OF THE INVENTION

1. Field of the Invention

The present invention relates to the phase synchronization of one or more digital units to a low frequency reference pulse train, and more particularly to such an arrangement in which each digital unit contains a digital divider chain (or $\div$ N counter) the sequence of which is to be synchronized to a predetermined phase of the reference pulse.

2. Description of the Prior Art

One known prior art approach for synchronizing one or more digital units to a common low frequency reference is the provision of a central timing unit with a plurality of cable paths for transmitting all synchronization signals from the central unit to each digital unit requiring synchronization. For example, in the field of time base synchronization of video equipment, such as the synchronization of a number of television cameras, the synchronization signals including a horizontal drive, vertical drive, mixed blank signal and mixed sync signal would be fed from the central unit to each camera by four cable circuits. A shortcoming of this approach is that it requires bulky coaxial transmission lines and is particularly cumbersome where substantial cable lengths are required.

Another known approach is to establish a source of a low frequency synchronization pulse train, and then to provide individual digital divider chains within the digital units which are to be brought into common synchronization. Each divider chain is driven by a phase lock loop synchronized to the source of reference pulses. Typically, the phase lock loop employs a voltage controlled multi-vibrator, some type of phase detector and an integrating network (having a low pass filter). The phase detector detects the phase error between the incoming signal and the output of the voltage controlled multi-vibrator. This error signal is integrated and applied to the voltage controlled oscillator for control thereof to establish the desired synchronization. This approach is of particular utility in conjunction with the time base generated video equipment, since each unit frequently contains its own divider chain. However, this approach exhibits shortcomings due to the lack of stability and the temperature dependence of any digital to analog control situation. Further, the low pass filter and voltage controlled multi-vibrator each require large capacitor RC networks, which is a drawback when MHP or LSI forms of high density packing fabrication are required.

Still another known prior art approach employs the phase lock loop concept of detection of an error signal which alters the count periods. The divider chain includes circuit elements which basically alter the counter construction, typically in the form of addition/subtraction of a single bit in the counter chain. This system phase shifts the divider chain either ahead or backward in time in increments associated with the addition/subtraction logic. A shortcoming of this approach is inherent lack of stability, particularly in television camera synchronization where the vertical interval switching among the units should be positively stable in order to avoid presentation break-up when transferring from one video source to another. Also, the requirement of a specialized counter circuit structure is a drawback when MHP of LSI forms of fabrication are desired, since tailor-made counters for such constructions are very expensive.

Yet another approach is disclosed in U.S. Pat. No. 3,755,748, entitled "Digital Phase Shifter/Synchronizer And Method of Shifting" to E. Carlow and E. Hepworth. Like the previous two approaches, a single cable circuit transmits the low frequence reference from the common source to the individual units, and each individual unit contains a divider chain. The pulse train driving the divider chain is incrementally shifted either forward or backward by one-half cycle increments responsive to a phase comparison to the reference pulse train. Like the approach of the addition/subtraction logic built into the count chain, this approach has the shortcoming of less than desired stability for maintenance of precise vertical interval lock with television camera units. Also, the approach requires at least five flip-flops and eight logic elements and therefore is a relatively complex circuit, with commensurate higher costs of MHP and LSI fabrication.

SUMMARY OF THE INVENTION

Briefly, the invention is a method and apparatus for causing at least approximate phase synchronization to be established between a timing sequence provided by a digital divider chain and a low frequency reference pulse. Further it provides a high degree of stability in the synchronism of a selected low frequency component of the divider chain output and the reference pulse train. The invention is embodied as a logic circuit for resetting the digital divider chain to zero in every cycle of its operation. The reset signal is generated by a first flip-flop which is reset to its LOW state during presence of a low state reference pulse, and which has the master oscillator pulse train applied to its toggle input. This causes initiation of a reset pulse with either of: (i) coincidence of a positive going transition of the low frequency reference pulse and a negative going transition of the master oscillator pulse, or (ii) if they do not coincide upon sequential occurrence of a positive going transition of the low frequency pulse and the next negative going transition of the master oscillator pulse. A second flip-flop is suitably connected to control the first flip-flop to prevent further changes to a HIGH state until appearance of the next LOW state of the low frequency pulse which holds the first flip-flop at its LOW state. Stated another way, two flip-flops are suitably connected to cause the first flip-flop to change to a HIGH state in response to a master oscillator pulse at a predetermined portion of the low frequency reference pulse cycle. Any other changing to a HIGH state of the first flip-flop is prevented by a combination of presence of the LOW state of the low frequency pulse train and a latching effect produced by suitable connection of the second flip-flop. Further logic elements are included to derive the reset signal from the change of the first flip-flop to its HIGH state in the form of a signal pulse having a duration less than that of the period of a master oscillator pulse cycle.

DESCRIPTION OF THE PREFERRED EMBODIMENT

Figure 1:
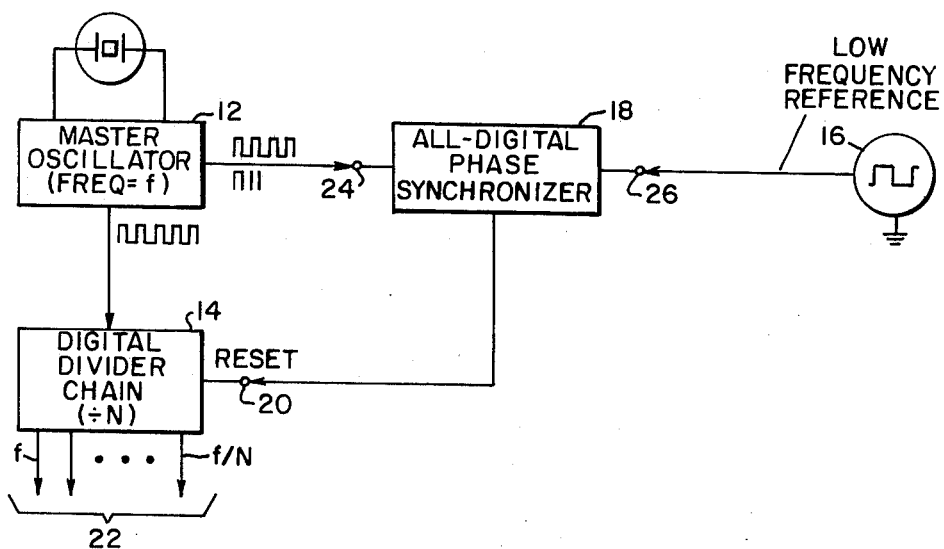
FIG. 1 is a block diagram of an embodiment of invention.

Referring now to the drawings and in particular to FIG. 1, a master oscillator 12 drives a digital divider chain 14 (also known as a ÷ N counter), which constitute a source of timing sequences. A low frequency reference pulse train source 16 and an all-digital phase synchronizer 18 function to bring the timing sequence output of the divider chain into phase synchronism with the output of source 16. Master oscillator 12 is of the conventional crystal controlled type providing an accurately regulated predetermined frequency of output, $f$, and is adapted to provide its output in the form of a symmetrical square wave pulse train. Digital divider chain 14 will be the subject of an amplified description in conjunction with FIG. 2. However, briefly it is of the conventional type including a series of divider stages, each of which may be individually reset to its ZERO condition. The resets of the individual divider stages are connected to a divider chain reset input terminal 20. For ease of description, divider chain 14 is assumed to provide a frequency division factor, N, of (16), which is produced by the serial connection of four ÷ 2 stages. It is to be understood that in many practical applications, such as in conjunction with the television sync generation sequence system of the U.S. Pat. No. 3,777,063 cited in the preamble hereof, the frequency division factor N may be of a much larger order of magnitude, e.g. 525, and the individual resettable stages may be of the so-called modulo counter type providing individual stage frequency division factors of 3, 5, 7, etc. The timing sequence outputs 22 of divider chain 14 are derived from discrete switching actions within the individual stages of the chain, and could for example include a series of sequences ranging from a high of the master oscillator frequency $f$ to a low of $f/N$. Reference source 16 is whatever oscillating frequency to which it is desired that the timing sequence 22, be subordinated. It may, for example, be an A.C. power line signal suitably wave-shaped into a symmetrical square wave, or it may be a synchronization signal generated by a digital divider chain in another unit which is defined to be the source of common digital system synchronization. All-digital phase synchronizer 18 has a master oscillator input 24 for receiving the train of pulses from master oscillator 12 and a low frequency reference signal input 26 for receiving the train of pulses from source 16. As will be apparent as the description proceeds, synchronizer 18 provides reset pulses of pulse durations less than the period of a master oscillator cycle coincident with or after every positive going transition of the low frequency reference pulse train. These reset pulses are applied to the reset input terminal 20 of divider chain 14.

Figure 2A:
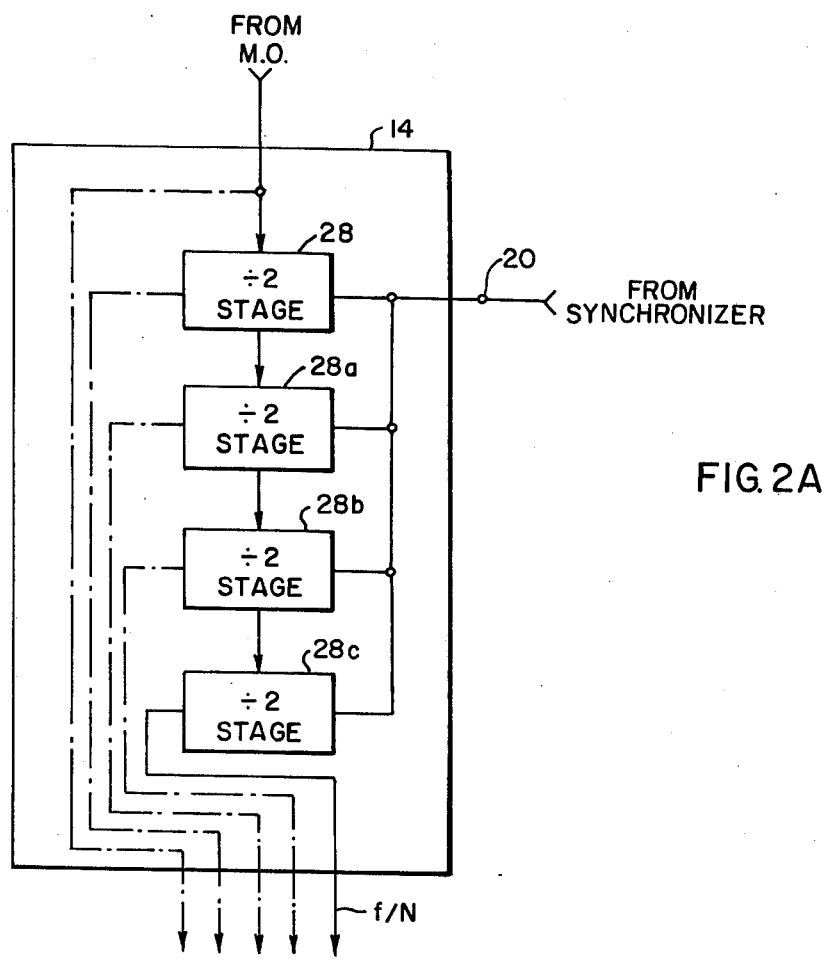
FIG. 2A is a block diagram of the internal construction of the digital divider chain of FIG. 1.
Figure 2B:
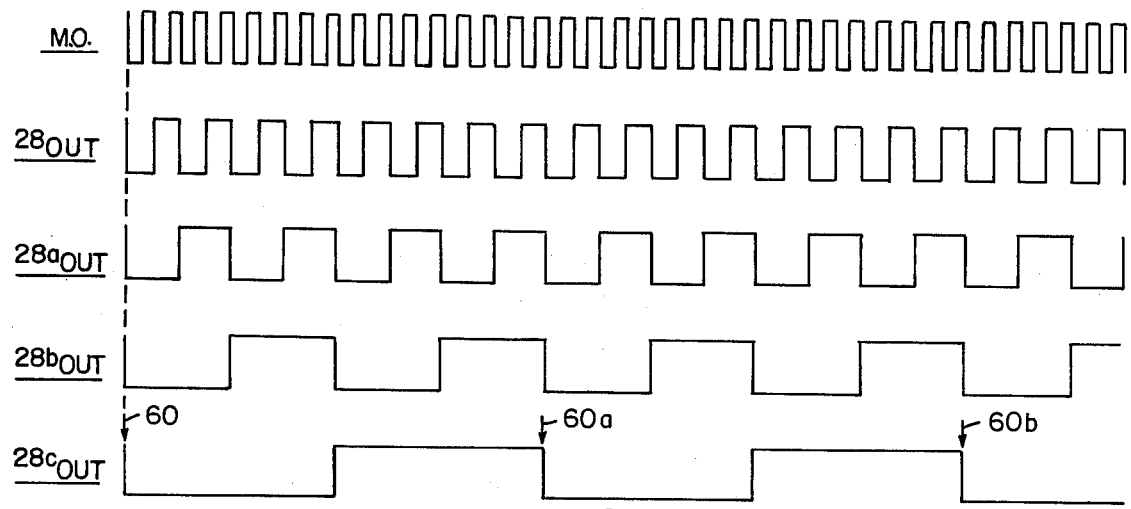
FIG. 2B is a family of logic timing curves associated with the operation of the digital divider chain.

Referring now to FIGS. 2A and 2B, digital divider chain 14 is of the well-known construction comprising four serially connected ÷ 2 stages 28, 28a, 28b and 28c, (also known as binary counter stages) each having their reset inputs connected to the divider chain reset input terminal 20. The desired timing sequence outputs 22, including the $f/N$ output (all others shown in phantom line since they are optional) are provided by conventional connections at the network points within divider chain 14. The logic timing waveform diagrams present at the outputs of the respective ÷ 2 stages are shown in FIG. 2B, and represent the well-known conventional operation of a divider chain.

Figure 3:
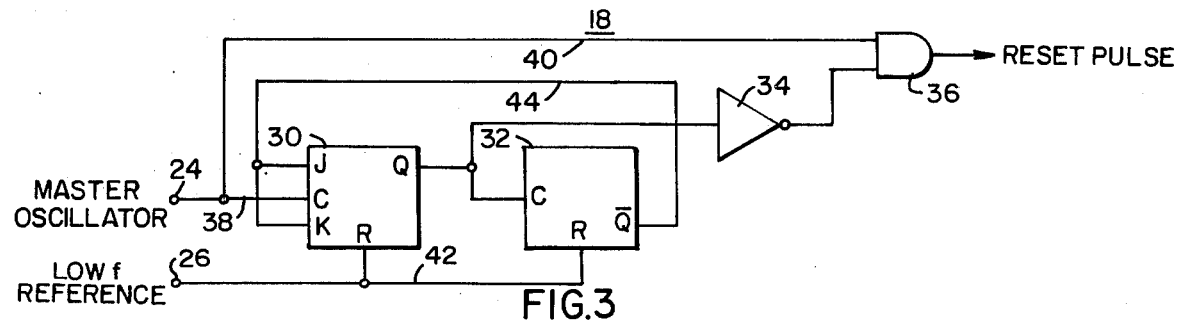
FIG. 3 is a schematic of the construction of the all-digital phase synchronizer of FIG. 1.

Referring now to FIG. 3, all-digital phase synchronizer 18 comprises a logic network formed from two flip-flops 30, and 32, a negation element 34, and an AND gate 36. Flip-flops 30 and 32 are each of the conventional J-K type which operates according to the following well-known logic rules. The application of a LOW logic state to the reset input R drives its regular output, Q, LOW for the duration of the applied LOW state at R. When a HIGH state is applied to R, J and K, a negative going transition of signal applied to the clock input C toggles the device from its preceding state to the other of its bistable states. When a LOW state is applied to J and K, the flip-flop will not change states with an incoming negative going edge applied to C. It is to be noted that the operation of the flip-flop under inputs to J, K and R is responsive to a steady state signal condition applied, whereas its operation under application of an input to C is effective on the negative going transition of the signal applied. Negation element 34 and AND gate 36 are of any suitable well-known construction.

The master oscillator signal input 24 of synchronizer 18, which receives the master oscillator pulse train, is connected to the C terminal of flip-flop 30 via a conductor 38, and also connected as one of the inputs to AND gate 36 via a conductor 40. The low frequency reference terminal 26 is connected to the reset terminals R of both flip-flops 30 and 32 via a conductor 42. The regular output Q of flip-flop 30 is connected to the clock input C of flip-flop 32 and also to negation element 34. The output of negation element 34 is connected as the other input to AND gate 36. The complemented output $\overline{Q}$ of flip-flop 32 is connected to the J and K inputs of flip-flop 30 via a conductor 44. As will be apparent from the succeeding description of logic waveforms, negation element 34 and AND gate 36 together comprise a pulse shaper which forms an output pulse having a period equal to one-half the period of the cycle of the master oscillator signal input. The output from AND gate 36 is the phase synchronization reset signal which is applied to reset 20 of digital divider chain 14, FIG. 1.

Figure 4:
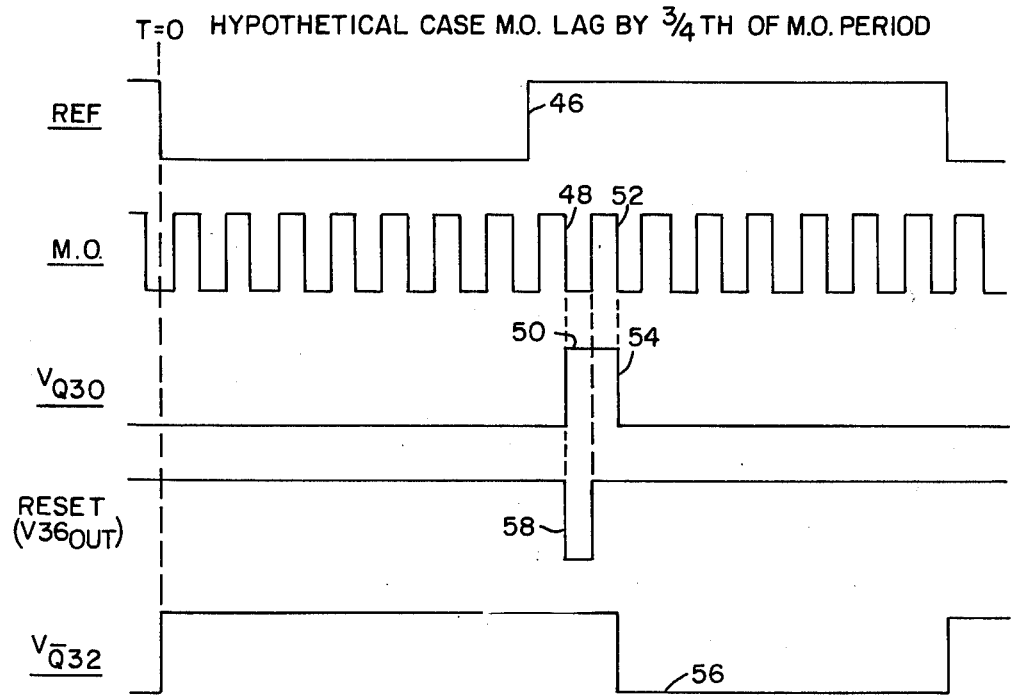
FIG. 4 is a family of logic timing curves associated with the operation of the all-digital phase synchronizer.

Reference is now made to FIG. 4 in order to describe the operation of all-digital phase synchronizer 18 in conjunction with a hypothetical case in which the master oscillator pulse train lags the low frequency reference pulse train by three-quarters of a master oscillator cycle period. This will be done by reference to the family of logic timing curves wherein curve REF represents the incoming low frequency reference pulse train; curve M.O. represents the master oscillator pulse train; curve $V_{Q30}$ represents the output state at output Q of flip-flop 30; curve RESET represents the state at the output of AND gate 36; and $V_{\overline{Q}32}$ represents the state of the complemented output of flip-flop 32. When wave REF goes HIGH at positive going transition 46, the next M.O. wave negative going transition 48 toggles flip-flop 30 producing a HIGH state 50 in wave $V_{Q30}$. The next succeeding negative going transition 52 of wave M.O. toggles $V_{Q30}$ LOW and the resultant negative going transition 54 of $V_{Q30}$ toggles $V_{\overline{Q}32}$ to its LOW state 56. Low state 56 holds the J and k inputs of flipflop 30 LOW preventing further toggling of flip-flop 30 in response to additional negative transitions of the M.O. wave, until $V_{\overline{Q}32}$ becomes HIGH as the result of the next application of a LOW state of the REF wave to its reset input R. Meanwhile, negation element 34 and AND gate 36 operate as coincidence gate which provides a negative pulse 58 of the RESET wave during the HIGH state 50 of wave $V_{Q30}$ and a LOW half period state of the M.O. wave. The duration of pulse 58 is consequently equal to one-half a period of the master oscillator cycle. It will be apparent from the foregoing that the AND gate 36 provides a RESET pulse if the negative going transition of the master oscillator pulse train deviates from coincidence with the positive going transition of the pulse train of the low frequency wave.

Figure 5:
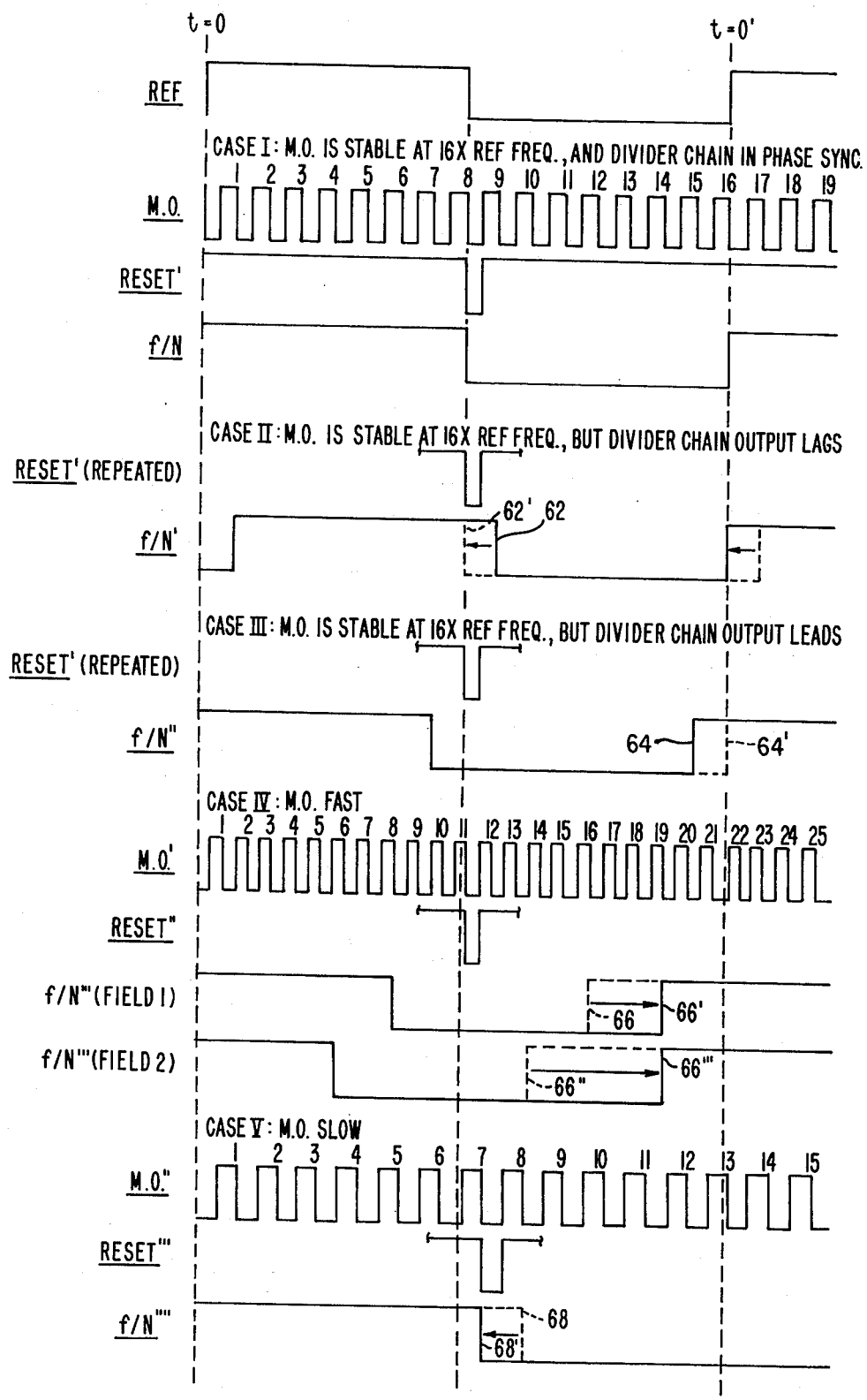
FIG. 5 is a family of logic timing curves which illustrate the operation of the invention with different relationships of the master oscillator pulse train and the low frequency reference pulse train.

Referring now to FIG. 5 the operation of the present invention will be described for five different cases of relative phase and frequency of the master oscillator pulse train and the low frequency REF pulse train. Case I, for the situation of a master oscillator in stable phase synchronization with the low frequency reference at a master oscillator frequency precisely 16 times the reference frequency, will be described with reference to: wave REF representing the low frequency reference pulse train; wave M.O. representing the master oscillator pulse train; wave RESET' representing the output from AND gate 36, FIG. 3; and wave $f/N$ representing the $f/N$ output of digital divider chain 14. The leading edge of the pulse of the RESET wave coincides with the negative going edge of the $f/N$ wave and thus has no effect on the counter operation. Stated in terms of the logic timing waves of FIG. 2B, the moment the ÷ 2 stages 28 of divider chain 14 are reset coincides with arrows 60, 60a, and 60b, indicated on waves $28c_{OUT}$. Case II, for the situation of a master oscillator which operates precisely at 16 times the low frequency reference signal, but the divider chain output lags is described by reference to: wave M.O.; wave RESET'; and wave $f/N'$. The pulse of the RESET wave occurs with its leading edge at the same time as the negative going transition of the low frequency reference pulse train. This causes the original negative going transition of $f/N'$ to be reset to position 62' in phase synchronism with the negative going transition of wave REF. It will be appreciated that this operation instantaneously acquires and maintains such phase synchronism. Case III, for the situation of a master oscillator of a frequency precisely 16 times than of the low frequency reference signal, but the divider chain output leads the reference signal is described by reference to: wave M.O.; wave RESET'; and wave $f/N''$. In this case the digital divider chain is reset early in its counting cycle and transfers the positive going transition 64 of wave $f/N''$ to phantom position 64' bringing divider chain 14 into phase synchronism with the low frequency reference. Case IV, for the situation of a fast master oscillator pulse train is described with reference to: wave M.O.'; wave RESET''; and wave $f/N'''$. The RESET'' pulses continually attempt to establish a divider chain output, $f/N'''$, equal in fequency to the low frequency pulse train and out of phase by an amount proportional to the master oscillator error. By the first reset pulse operation the positive going transition of wave $f/N'''$ is shifted from phantom line position 66 to solid line position 66', and in the second and subsequent operations of the reset pulse from phantom line position 66'' to solid line position 66'''. Case V, for the slow master oscillator situation is described with reference to: wave M.O.'''; wave RESET''''; and wave $f/N'''$. Here the reset pulses continually attempt to establish a divider chain output $f/N''''$ equal in frequency to the low frequency REF through the shift of the negative going transition from phantom line 68 to solid line 68' of wave $\div N_{OUT4}'$.

From the foregoing it will be appreciated that the method and apparatus of synchronizing the phase of operation of a divider chain in accordance with a low frequency referency pulse train of the present invention offers many advantages:

1. In the situation of a master oscillator of the proper frequency, coincident phase synchronization can be instantaneously maintained and achieved.

2. In the situation of a master oscillator not of the proper frequency, relative phase synchronization can be achieved and maintained.

3. The foregoing advantages can be implemented by purely digital techniques compatible with MHP and LSI forms of digital circuit fabrication.

Figure 6:
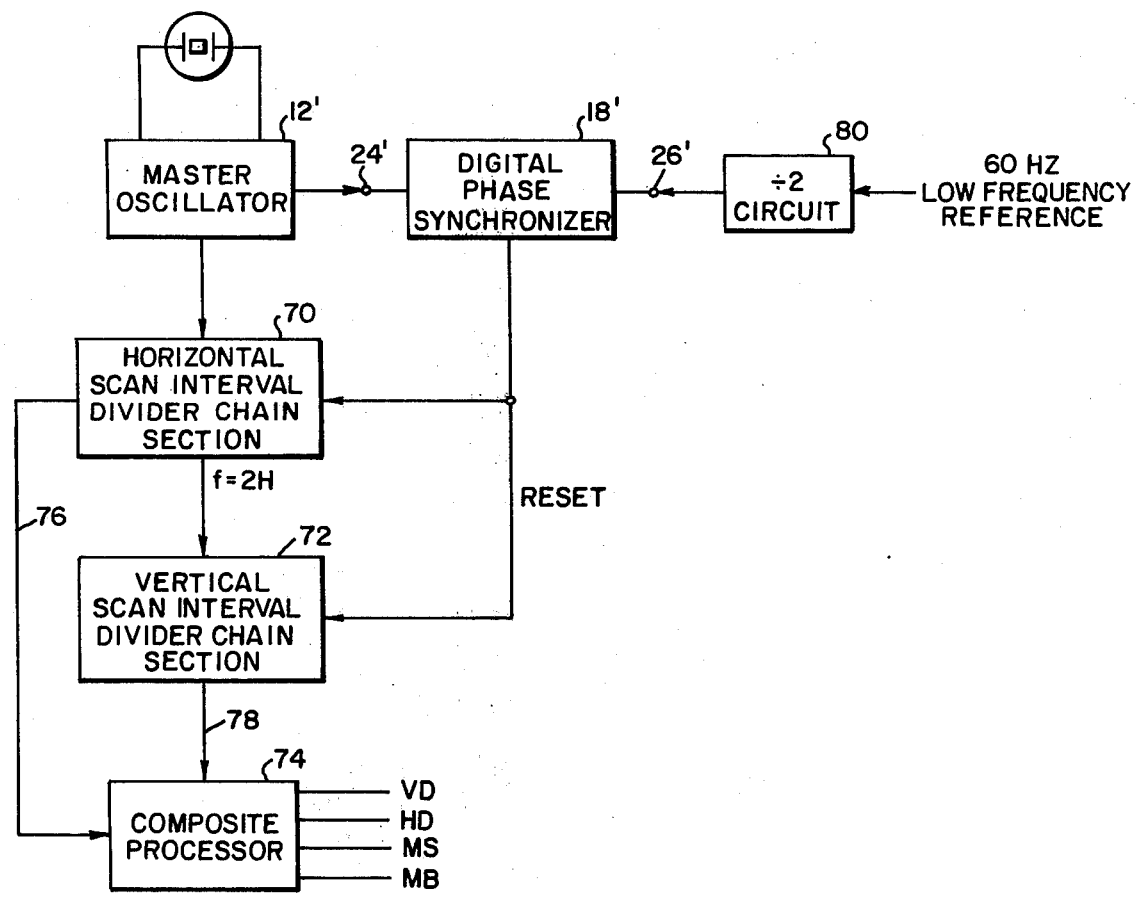
FIG. 6 is a block diagram of an embodiment of invention related to television synchronization timing.

Reference is now made to FIG. 6 for an embodiment of the invention employed in conjunction with an organization for the generation of television synch signals of the type disclosed in U.S. Pat. No. 3,777,063 cited in the preamble hereof. In FIG. 6, components which are identical to those hereinbefore described are designated by the same reference number with the addition of a single prime symbol (') as a suffix. A timing unit consists of master oscillator 12', a horizontal scan interval digital divider train section 70, a vertical scan interval digital divider train section 72, and a composite processor 74 such as disclosed in the aforecited patent. This organization is designed to provide a 2:1 interlace type raster pattern. Horizontal scan interval section 70 provides a division factor of (25), and the high frequency master clock 12' provides a frequency so chosen that the output of section 70 has a frequency equal to twice the frequency of horizontal scan lines. Logic states available in the horizontal scan interval section 70 are applied to the composite processor 74 via cable 76. Vertical scan interval section 72 performs a ÷525 division factor which generates the vertical scan reference frequency. The logical states available in the vertical scan interval section 72, including the ÷525 vertical countdown sequence, are applied to composite processor 74 by cable 78. Composite processor 74 provides vertical drive (VD), horizontal drive (HD), mixed sync (MS) and mixed blank (MB) conventional 2:1 interlace raster timing sequence signals as its output. The low frequency reference pulse train for application to input 26' of phase synchronizer 18' is conventionally a 30 Hz pulse train required for 2:1 interlacing. The source of this reference signal may be either a 60 cycle A.C. line signal passed through a wave shaper (not shown) and a ÷2 circuit 80, or a vertical time base signal from another raster pattern forming unit. The output high frequency master oscillator 12' is applied to input 24' of synchronizer 18'. The reset output pulse from synchronizer 18' is applied to a reset input terminal of horizontal divider chain section 70, and also to a reset input of vertical divider chain section 72.

In operation, the application of the reset pulse from synchronizer 18' to vertical scan interval divider chain section 72 acts to instantaneously bring the vertical interval signal to within 2H synchronism with the reference signal from the ÷2 circuit 80 (where H is the horizontal scan interval). The application of the reset pulses from synchronizer 18' to the horizontal scan interval divider chain section 70 acts to cause convergence to perfect synchronization within the tolerance of the high frequency master oscillator period. A constant horizontal interval frequency is maintained at all times except at the point during which the corrective reset occurs, which is intentionally timed to occur during the vertical retrace interval to avoid visual detection in a raster presentation. It will be appreciated that under conditions of a varying low frequency reference, the horizontal interval frequency will remain constant, but the number of active scan lines could change every frame to maintain vertical interval synchronism. It has been found that by use of a stable crystal controlled master oscillator and the normal tolerances of 60 Hz line references, interframe jitter will be negligible among a number of television camera or other video signal generator units under a source of mutual synchronization.

The organization of FIG. 6 results in the possibility of the active scan lines changing every frame of the video raster pattern. It will be appreciated that the simple modification of further division of the low frequency reference signal before application to input 26' of synchronizer 18' would result in changes once every several frames, if desired.

I claim:

1. A digital divider phase locking system for synchronizing the divider output signal with respect to a reference pulse train alternately having first and second levels, and having a predetermined frequency, said phase locking system comprising:

at least one resettable counter stage for providing an output signal in response to the signal applied to an input;

a source for providing a clock pulse train alternately having first and second levels, and having a higher frequency than the frequency of said reference pulse train, said clock pulse train being applied to the input of the counter stage;

a first binary logic element responsive to signals provided to first, second, and third inputs to provide an output signal having alternately high and low states, said first binary logic element providing a transition between the states of the output signal in response to a transition between levels of the clock pulse train applied to the first input in combination with one level of the reference pulse train applied to the second input and a signal of one of a high or low state applied to the third input;

a second binary logic element responsive to signals provided to first and second inputs to provide an output signal having alternately high and low states, said second binary logic element providing an output signal of the other of the high or low states to the third input of said first binary logic element in response to the transition in the output signal of the first logic element applied to the first input of said second binary logic element in combination with the one level of the reference pulse train applied to the second input of said second binary logic element; and a binary logic circuit that is responsive to one state of the output of said first binary logic element in combination with one level of the clock pulse train to provide a reset signal for synchronizing the phase of the counter stage output signal with respect to the phase of the reference pulse train by resetting the counter stage to an initial condition.

2. A system in accordance with claim 1 wherein said counter stage has a reset input and is operative to reset the counter stage output to ZERO in response to the application of the reset signal to said reset input, and wherein said binary logic circuit provides a reset signal to the reset input of the counter stage, said reset signal being a pulse signal having a pulse duration less than the period of said clock pulse train.

3. A system in accordance with claim 2, wherein said low frequency reference pulse train and said clock pulse train are symmetrical square waves, and wherein the frequency of said reference pulse train is substantially a subharmonic of the frequency of said clock pulse train.

4. A system for generating a sequence of timing signals that are in phase synchronization with a reference pulse train having alternate first and second levels and having a predetermined frequence, said system comprising:

a source for providing a periodic clock pulse train having alternate first and second levels, having a higher frequency than said reference pulse train, and having a phase that is independent of the phase of said reference pulse train;

a plurality of serially connected counter stages that are responsive to the periodic clock pulse train to provide the sequence of timing signals;

a first binary logic element responsive to signals provided to first, second, and third inputs to provide an output signal having alternately high and low states, said first binary logic element providing a transition between the states of the output signal in response to a transition between levels of the clock pulse train applied to the first input in combination with one level of the reference pulse train applied to the second input and a signal of one of a high or low state applied to the third input;

a second binary logic element responsive to signals provided to first and second inputs to provide an output signal having alternately high and low states, said second binary logic element providing an output signal of the other of the high or low states to the third input of said first binary logic element in response to the transition in the output signal of the first logic element applied to the first input of said second binary logic element in combination with the one level of the reference pulse train applied to the second input of said second binary logic element; and a binary logic circuit that is responsive to one state of the output of said first binary logic element in combination with one level of the clock pulse train to provide a reset signal for synchronizing the phase of the timing signals of said counter stages with respect to the phase of the reference pulse train by collectively resetting all of the counter stages to their respective initial conditions.

5. The generating system of claim 4 wherein said first and second binary logic elements are further operative to prevent resetting of the counter stages when the reference pulse train is at said other level.

6. The generating system of claim 5 wherein said first and second binary logic element are further operative to prevent resetting of the counter stages when the reference pulse train is in a first state at times after the transition of the transition of the first output signal.

7. Apparatus in accordance with claim 6, wherein
said periodic clock pulse train and said periodic reference pulse train are both symmetrical square waves, and wherein
the frequency of said clock pulse train is a substantially a harmonic of said reference pulse train.

8. A method for synchronizing the phase of timing signals in a timing system in which a digital divider that includes at least one counter stage is driven by a periodic clock pulse train having alternating first and second levels and having a predetermined frequency, said digital divider being driven with respect to the phase of a periodic reference pulse train having alternating first and second levels and having a lower frequency than that of the clock pulse train, said method comprising the steps of:
providing a transition between high and low states of a first output signal in response to a transition between first and second levels of the clock pulse train in combination with one level of the reference pulse and a signal of one of a high or low state, said first output signal cooperating with said clock pulse train to collectively reset the digital divider to an initial condition in response to the combination of a transition between levels of the clock pulse train when the reference pulse train is at a first level, said first output signal preventing resetting of the divider when the reference pulse train is at a second level; and
providing a second output signal of the other of a said high or low states in response to a transition in the first output signal in combination with said one level of the reference signal, said second output signal preventing resetting of the divider when the reference pulse train is at a first level at times after the transition of the first output signal.

9. A method in accordance with claim 8, wherein
said periodic clock pulse train and said periodic reference pulse train are both symmetrical square waves, and wherein
the frequency of said clock pulse train is substantially a harmonic of the frequency of the said reference pulse train.

10. A digital divider chain timing system with provision for phase synchronization with a low frequency reference pulse train having a predetermined frequency, said timing system comprising:
a plurality of serially connected, resettable counter stages for providing a sequence of timing signals;
a source for providing a clock pulse train which is higher in frequency than the predetermined frequency, said clock pulse train being applied to the input of the serially connected counter stages;
input means for receiving the low frequency reference pulse train; and
means for resetting the plurality of counter stages to their respective ZERO output conditions in response to both said reference pulse train and said clock pulse train, wherein said resetting means includes: a bistable means having a toggle input operatively connected to receive said clock pulse train and having a reset input operatively connected to said input means, said bistable means being operative to change state in response to each pulse applied to the toggle input and being operative to be in its LOW state for the duration of a pulse of said low frequency reference pulse train at said reset input irrespective of the signal applied to its toggle input; means for deriving a signal to reset said plurality of counter stages in response to a HIGH state of said bistable means; and means responsive to a HIGH state of said bistable means to prevent the change of state of the bistable means in response to pulses received at its toggle input until the next pulse of the low frequency reference pulse train at the reset input of the bistable means.

11. A system in accordance with claim 10 wherein
said low frequency reference pulse train and said clock pulse train are symmetrical square waves, and
wherein the frequency of said reference pulse train is substantially a subharmonic of the frequency of said clock pulse train.

12. A phase synchronizer that provides a reset signal in response to a clock pulse train having a predetermined frequency, and a reference pulse train having a lower frequency than said predetermined frequency, said synchronizer comprising:
a first binary logic element that is responsive to signals provided to first, second and third inputs to provide an output signal having high and low states, said first input being responsive to the clock pulse train, and said second input being responsive to the reference pulse train;
a second binary logic element that is responsive to signals provided to first and second inputs to provide an output signal having high and low states, said first input being responsive to the output of the first logic element, and said second input being responsive to the reference pulse train to provide an output signal of one state to the third input of said first binary logic element; and
a binary logic circuit that is responsive to said one state of the output of said first binary logic element, and that is responsive to the clock pulse train to provide the reset signal.

13. A phase synchronizer that provides a reset signal in response to a clock pulse train having a predetermined frequency, and a reference pulse train having a lower frequency than said predetermined frequency, said synchronizer comprising: a first flip-flop that is responsive to signal provided to clock, reset, and third inputs to provide an output signal having high and low states, said clock input being responsive to the clock pulse train, and said reset input being responsive to the reference pulse train;
a second flip-flop that is responsive to signals provided to clock and reset inputs to provide an output signal having high and low states, said clock input being responsive to the transition between states of the output of the first logic element, and said reset input being responsive to the reference pulse train to provide an output signal of one state to the third input of said first flip-flop; and a binary logic circuit that is responsive to said one state of the output of said first flip-flop, and that is responsive to the clock pulse train to provide the reset signal.

14. The phase synchronizer of claim 13 wherein said binary logic circuit includes:

an inverter that provides an output in response to the output of the first flip-flop; and an AND gate that provides the reset signal in response to the output of the inverter and the clock pulse train.

15. A phase synchronizer that provides a reset pulse in response to a clock pulse train having a predetermined frequency, and a reference pulse train having a lower frequency than said predetermined frequency, said synchronizer comprising:

a first J-K type flip-flop that provides an output signal having a high state in response to the transition between high and low states of an input signal provided to a clock input and the high state of input signals provided to reset, J, and K inputs, said clock input being responsive to the clock pulse train, and said reset input being responsive to the reference pulse train;

a second J-K type flip-flop that provides an output signal to the J and K inputs of said first flip-flop, said output signal having a low state in response to a transition between high and low states of an input signal provided to a clock input and the high state of input signals provided to a reset input, said clock input being responsive to the transition between states of the first flip-flop output and said reset input being responsive to the high state of the reference pulse train to provide an output signal of a low state to the J and K inputs of said first flip-flop; and a binary logic circuit that is responsive to the high state of the output of said flip-flop, and that is responsive to the high state of the clock pulse train to provide the reset pulse.

16. A phase synchronizer that provides a reset pulse in response to a clock pulse train having a predetermined frequency, and a reference pulse train having a lower frequency than said predetermined frequency, said synchronizer comprising:

a first J-K type flip-flop that provides an output signal having a high state in response to the high state to low state transition of an input signal provided to a clock input at times when a high state of input signals is provided to reset J, and K inputs, and that provides an output signal having a low state in response to the low state of an input signal provided to at least one of the reset, J, and K inputs, said clock input being responsive to the clock pulse train, and said reset input being responsive to the reference pulse train such that, when the input signal to the J and K inputs is high, the first flip-flop provides an output of a high state in response to the high state to low state transition of said clock pulse train and the high state of said reference pulse train;

a second J-K type flip-flop that provides an output signal to the J and K inputs of said first flip-flop, said output signal having a low state in response to a high state to low state transition of input signals provided to a clock input and a high state of input signals provided to a reset input, and having a high state in response to the low state of an input signal provided to the reset input, said clock input being responsive to the output of the first flip-flop, and said reset input being responsive to the reference pulse train such that the second flip-flop provides an output of a high state to the J and K inputs of said first flip-flop in response to the low state of the reference pulse train, and such that the second flip-flop provides an output of a low state to the J and K inputs of said first flip-flop in response to the high state of the reference pulse train and the high state to low state transition of the output of the first flip-flop; and a binary logic circuit that is responsive to the high state of the output of said first flip-flop, and that is responsive to the high state of the clock pulse train to provide the reset pulse.

17. The phase synchronizer of claim 16 wherein said binary logic circuit includes:

an inverter that provides an output of a high state in response to the low state output of the first flip-flop, and that provides an output of a low state in response to the high state output of the first flip-flop, and a NAND gate that provides the reset pulse in response to the combination of the high state of the clock pulse train and the high state of the inverter output.

18. In a signal timing system having a digital divider train that is responsive to the clock pulse train of an oscillator to provide timing signals, a phase synchronizer that is also responsive to the clock pulse train of the oscillator, and to a reference pulse train for resetting the counters of the digital divider train to synchronize the timing signals of the divider chain with respect to the reference pulse train, said phase synchronizer comprising:

a first flip-flop that is responsive to signals provided to clock, reset and third inputs to provide an output signal having high and low states, said clock input being responsive to the clock pulse train, and said reset input being responsive to the reference pulse train;

a second flip-flop that is responsive to signals provided to clock and reset inputs to provide an output signal having high and low states, said clock input being responsive to the transition between states of the output of the first logic element, and said reset input being responsive to the reference pulse train to provide an output signal of one state to the third input of said first flip-flop; and a binary logic circuit that is responsive to said one state of the output of said first flip-flop, and that is responsive to the clock pulse train to provide the reset signal.

19. In a signal timing system having a digital divider train that is responsive to the clock pulse train of an oscillator to provide timing signals, a phase synchronizer that is also responsive to the clock pulse train of the oscillator, and to a reference pulse train for resetting the counters of the digital divider train to synchronize the timing signals of the divider chain with respect to the reference pulse train, said phase synchronizer comprising:

a first J-K type flip-flop that provides an output signal having a high state in response to the high state to low state transition of an input signal provided to a clock input at times when a high state of input signals is provided to reset, J, and K inputs, and that provides an output signal having a low state in response to the low state of an input signal provided to at least one of the reset, J, and K inputs, said clock input being responsive to the clock pulse train, and said reset input being responsive to the reference pulse train such that, when the input signal to the J and K inputs is high, the first flip-flop provides an output of a high state in response to the high state to low state transition of said clock pulse train and the high state of said reference pulse train;

a second J-K type flip-flop that provides an output signal to the J and K inputs of said first flip-flop, said output signal having a low state in response to a high state to low state transition of input signals provided to a clock input and a high state of input signals provided to a reset input, and having a high state in response to the low state of an input signal provided to the reset input, said clock input being responsive to the output of the first flip-flop, and said reset input being responsive to the reference pulse train such that the second flip-flop provides an output of a high state to the J and K inputs of said first flip-flop in response to the low state of the reference pulse train, and such that the second flip-flop provides an output of a low state to the J and K inputs of said first flip-flop in response to the high state of the reference pulse train and the high state to low state transition of the output of the first flip-flop; and a binary logic circuit that is responsive to the high state of the output of said first flip-flop, and that is responsive to the high state of the clock pulse train to provide the reset pulse.

20. The phase synchronizer of claim 19 wherein said binary logic circuit includes:

an inverter that provides an output of a high state in response to the low state output of the first flip-flop, and that provides an output of a low state in response to the high state output of the first flip-flop, and an AND gate that provides the reset pulse in response to the combination of the high state of the clock pulse train and the high state of the inverter output.

* * * * *